Dec. 22, 1953　　　G. W. BENBURY ET AL　　　2,663,463
CONTAINER HAVING A FLEXIBLE NOZZLE AND A FLEXIBLE CAP
Filed June 11, 1949　　　　　　　　　　　　　2 Sheets-Sheet 1

INVENTORS

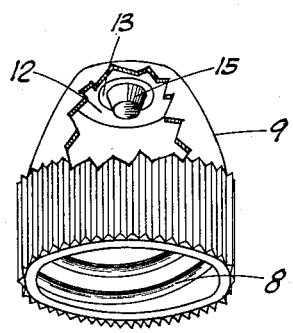
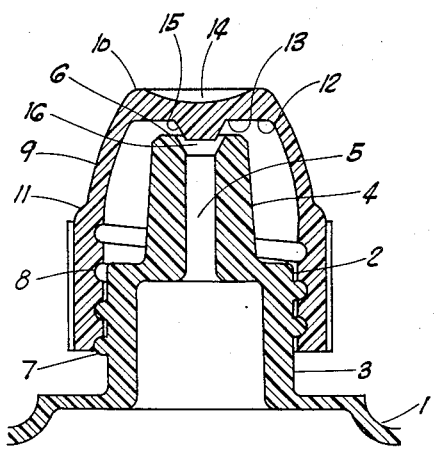
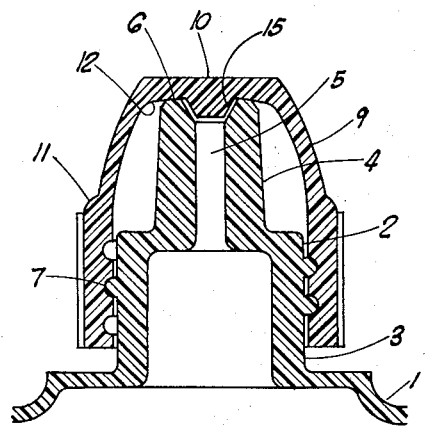

Patented Dec. 22, 1953

2,663,463

UNITED STATES PATENT OFFICE 2,663,463

CONTAINER HAVING A FLEXIBLE NOZZLE AND A FLEXIBLE CAP

George White Benbury, Drexel Hill, and Herbert Walter Ingham, Lansdowne, Pa., assignors to The Pennsylvania Salt Manufacturing Company, Philadelphia, Pa., a corporation of Pennsylvania Application June 11, 1949, Serial No. 98,758

3 Claims. (Cl. 222—215)

This invention relates to container closures and more particularly to sealing closures for bottles or like containers.

Considerable difficulty has been encountered heretofore in obtaining good seals between a bottle closure and the neck or other structure surrounding the opening into the bottle to which the closure is secured. Various materials and structures have been used in order to prevent leakage from the bottle after the closure has been secured thereto. Most of these have consisted of having, in the closure, a packing material such as rubber, cork or specially prepared papers which are adapted to contact yieldingly the hard rim of the bottle neck when the closure is secured thereto to seal the bottle opening from leakage.

The closure itself is generally formed of a hard nonyielding material such as a hard plastic, hard rubber or metal into which threads are cut to engage matching threads on the neck of the bottle, which threads are normally also formed of a hard material. It is usually necessary to exert considerable torque when securing the closure onto the neck of the bottle in order to obtain a sufficiently tight seal to prevent any leaking between the closure cap and the bottle neck and to insure that the seal obtained will be maintained over extended periods during which the container or bottle is subjected to handling.

We have now discovered that if the portion of the bottle neck, which is adapted to engage the closure in sealing relation thereto and the inner portion of the closure with which it is adapted to engage are formed of polyethylene (the term polyethylene as used in the specification and claims defining the solid polymerized ethylene resins in which the molecular weight is over 10,000) or of some other material of substantially uniform consistency having the tough, relatively soft, partially elastic properties of polyethylene, an excellent seal is obtained without the necessity of overly tightening the closure on the bottle. Also, by forming both sealing surfaces of polyethylene or a similar material, continued removal and replacement of the closure on the container does not appear to materially affect the seal obtained between the two whereas the seal generally is ruined in the conventional type container seal in which a hard rim engages a softer sealing material since, with such a structure, the softer sealing material tends to lose resiliency and become permanently deformed.

We have further discovered that if the threads or equivalent fastening means are formed of polyethylene or a like material there is substantially no relative movement between the closure and the container even though subjected to considerable handling once the closure is secured thereto. Probably the reason for this is that the consistency of the material is such that there is sufficient distortion, due to the physical characteristics of the polyethylene, to insure an appreciable pressure, resulting in sufficient friction between the container and closure threads to prevent slippage. Such a construction is highly advantageous since the closure, when once secured to the container, remains securely attached thereto, thus preventing any leakage even though the container is subjected to considerable handling. Furthermore, a tight seal is maintained without the necessity of overly tightening the closure on the container in order to prevent loosening as has heretofore been necessary. This results in a longer lived seal and easier removal of the closure from the container when removal is desired.

It is obvious that our invention may be practiced in many forms since a wide variety of closure and container designs could be prepared in which the sealing surfaces of the closure and container are made of polyethylene or an equivalent material and in which the screw threads or equivalent fastening means on the container and closure are also made of such a material. In order to better illustrate our invention, a novel polyethylene bottle and closure, illustrating a specific embodiment of the invention, are illustrated in the accompanying drawings and described in the specification.

In the drawings:

Figure 3 is a perspective view of the closure in which a portion is broken away so that the sealing surface and conical shaped guide may be illustrated;

Figure 4 is a cross-sectional view of the upper portion of the container with the closure loosely secured thereto; and Figure 5 is a cross-sectional side view of the upper portion of the container with the closure secured thereto.

Figure 1:
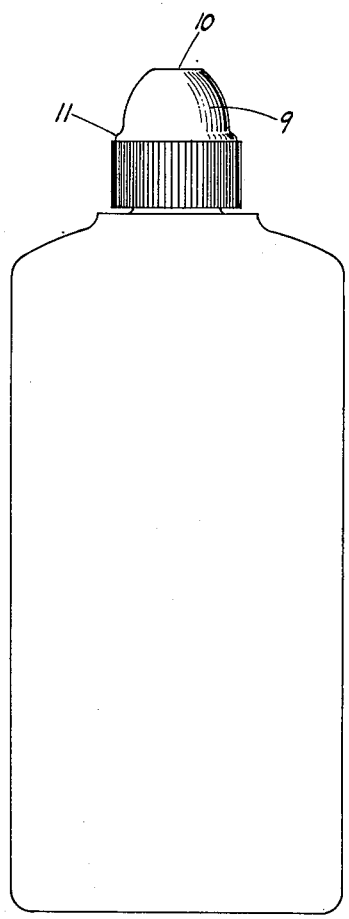
Figure 1 is a side view of the container with the closure secured thereto.
Figure 2:
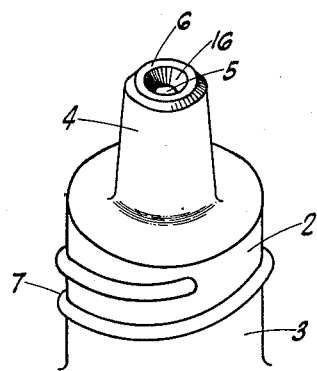
Figure 2 is a perspective view of the upper portion of the container showing the neck and sealing surface in detail.

Referring to the drawings 1 is a container made of polyethylene or an equivalent material having a neck 2 formed with an enlarged base 3 and an elongated nozzle section 4. A passage 5 extends through the neck 2 so as to communicate with the interior of the container 1 for admitting or removing fluids. The nozzle 4 is formed so as to terminate in a relatively fine annular edge 6 provided with an even surface which acts as the sealing surface of the container. Polyethylene threads 7 are formed on the enlarged base section 3 for engaging similar threads 8 formed on a polyethylene closure 9.

The closure 9 consists of an end section 10 and a flange section 11 which is provided with the previously mentioned threads 8. The inner surface 12 of end section 10 is provided with a smooth, substantially even sealing surface 13 adapted to sealingly engage the surface 6 when the closure 9 is attached to the container 1. In order to provide a greater continued pressure between the sealing surfaces 6 and 13 when the closure is secured to the container, the end section 10 is formed so as to have a diameter substantially greater than the diameter of the sealing edge 6 and so as to decrease in cross-sectional area towards its center. This latter is accomplished by shaping convexly its outer surface as shown at 14.

In order to assure proper alignment of the sealing surfaces 6 and 13 the inner surface 12 of end section 10 is further provided with a conical protrusion 15 adapted to enter a conical opening 16 formed at the end of passage 5. Protrusion 15 and similarly formed co-acting opening 16 are not to be confused with sealing surfaces, the seal being obtained between surfaces 6 and 13. When the nozzle and neck portions of the container are formed of a yielding, partially resilient material such as polyethylene there is a tendency for these portions to depart slightly from their original formed positions due to handling or other reasons. Some provision for insuring proper alignment between these sealing surfaces is therefore highly desirable. It is obvious that various structures, equivalent to that shown, may be used to obtain this result. In order to aid in the securing and removal of the closure 9, conventional corrugations are formed on the lower portion of the flange 11.

Containers of the type described have been found to be particularly useful in the handling of corrosive or volatile materials where a tight seal is desired and where the materials are to be dispensed in relatively small amounts since a tight seal is insured even after the closure has been removed and then replaced numerous times.

Though the illustrated container and closure are believed to be novel in and of themselves, they should not be considered as limiting the invention, but rather as illustrating one embodiment of the invention since the invention in its broader aspects comprises the use of polyethylene or a material having similar physical characteristics for forming the co-acting sealing surfaces of the closure and the container, and the use of such material for forming the threads or like securing means on the container and closure. Obviously, many modifications other than the specific examples given can be made in which these features are present. Also, the invention should not be limited to polyethylene since it is apparent that other materials having the frictional surface properties as well as the tough, relatively soft, partially resilient properties of polyethylene could be used. Thus, for example, one might use certain grades of rubber, polyvinyl chloride or other material having these properties.

Having thus described our invention, we claim:

1. In a container formed of flexible material, a neck terminating in a flexible nozzle, a flat sealing surface formed on the end of said nozzle, a closure for said container adapted to fit over the end of said nozzle having an end portion and a flange portion, said end portion lying in a plane substantially perpendicular to said flange portion and having a diameter substantially greater than the diameter of the sealing surface on the end of said nozzle, a concave depression formed on the outer surface of said end portion to increase its resiliency, a substantially flat sealing surface formed on the inner surface of said end portion, coacting guide means formed on the end of said nozzle and on the inner surface of said closure, separate from said sealing surfaces, for bringing said sealing surfaces into alignment when securing said closure to said container, said guide means being substantially unengaged when said sealing surfaces are in perfect alignment, and fastening means formed on said closure and neck to secure said closure to said container.

2. In a container formed of flexible material, a neck terminating in a flexible nozzle, a flat sealing surface formed on the end of said nozzle surrounding a conoidal recess formed in the end of said nozzle, a closure for said container adapted to fit over the end of said nozzle having an end portion and a flange portion, said end portion lying in a plane substantially perpendicular to said flange portion and having a diameter substantially greater than the diameter of the sealing surface on the end of said nozzle, a concave depression formed on the outer surface of said end portion to increase its resiliency, a circular substantially flat sealing surface formed on the inner surface of said end portion, a conical projection formed on the inner surface of said end portion within said circular sealing surface and extending downwardly therefrom adapted to engage said conoidal recess to bring said sealing surfaces into alignment with each other when said closure is secured to said container, said conical projection being sufficiently smaller than said conoidal recess that there is substantially no engagement between said projection and recess when said sealing surfaces are in perfect alignment and only partial contact between the surfaces of said projection and recess when said sealing surfaces are out of proper alignment, and fastening means formed on said closure and neck to secure said closure to said container.

3. A container formed of material similar in consistency to polyethylene, a neck on said container having a base portion and a nozzle portion, said nozzle being of substantially smaller diameter than said base, threads formed on said base portion, a narrow sealing surface formed at the end of said nozzle lying in a plane substantially perpendicular to said nozzle and having an area substantially less than the cross-sectional area of said nozzle, a passage extending through said neck into the interior of said container, said passage being enlarged at its exit from said nozzle to provide a conoidal-shaped opening, a closure formed of material similar in consistency to polyethylene for said container adapted to fit over the end of said nozzle and having an end portion and a flange portion, said end portion lying in a plane substantially perpendicular to said flange portion and having a diameter substantially greater than the diameter of the sealing surface on the end of said nozzle, a concave depression formed on the outer surface of said end portion to increase its resiliency, a circular substantially flat sealing surface formed on the inner surface of said end portion, a conical projection formed on the inner surface of said end portion within said circular sealing surface and extending downwardly therefrom adapted to engage said conoidal-shaped opening to bring said sealing surfaces into alignment with each other when said closure is secured to said container, said conical projection being sufficiently smaller than said conoidal-shaped opening that there is substantially no engagement between said projection and opening when said sealing surfaces are in perfect alignment and only partial contact between the surfaces of said projection and opening when said sealing surfaces are out of proper alignment said engagement being necessary to align said sealing surfaces, screw threads formed on the inner surface of said closure flange adapted to coact with the screw threads formed on said neck base to secure said closure to said container.

GEORGE WHITE BENBURY.
HERBERT WALTER INGHAM.

References Cited in the file of this patent

UNITED STATES PATENTS

| Number | Name | Date |
| --- | --- | --- |
| 1,057,538 | Gammeter | Apr. 1, 1913 |
| 1,538,094 | Davis | May 19, 1925 |
| 1,854,451 | Cooney | Apr. 19, 1932 |
| 1,876,152 | Sheaffer | Sept. 6, 1932 |
| 1,909,209 | Miller | May 16, 1933 |
| 1,935,100 | Paull et al. | Nov. 14, 1933 |
| 2,029,020 | Erhard | Jan. 28, 1936 |
| 2,038,760 | Roselle | Apr. 28, 1936 |
| 2,238,681 | Dorough | Apr. 15, 1941 |
| 2,322,213 | Amberg | June 22, 1943 |